United States Patent
Katz et al.

(10) Patent No.: US 10,387,805 B2
(45) Date of Patent: Aug. 20, 2019

(54) SYSTEM AND METHOD FOR RANKING NEWS FEEDS

(71) Applicant: Osherg Technologies Ltd., Shefayim (IL)

(72) Inventors: Eliezer Katz, Tel Aviv (IL); Ofer Weintraub, Herzliya (IL)

(73) Assignee: DEEP IT LTD, Shefayim (JP)

( * ) Notice: Subject to any disclaimer, the term of this patent is extended or adjusted under 35 U.S.C. 154(b) by 390 days.

(21) Appl. No.: 14/908,820

(22) PCT Filed: Jul. 16, 2014

(86) PCT No.: PCT/IL2014/005069
§ 371 (c)(1),
(2) Date: Jan. 29, 2016

(87) PCT Pub. No.: WO2016/009419
PCT Pub. Date: Jan. 21, 2016

(65) Prior Publication Data
US 2016/0170993 A1    Jun. 16, 2016

(51) Int. Cl.
G06F 17/30    (2006.01)
G06Q 10/00    (2012.01)
G06F 16/9535    (2019.01)

(52) U.S. Cl.
CPC ......... *G06Q 10/00* (2013.01); *G06F 16/9535* (2019.01)

(58) Field of Classification Search
CPC ........... G06F 17/3053; G06F 17/30554; G06F 17/30867; G06F 16/9535; G06Q 10/00
USPC ....... 707/723, 726, 736, 748, 749, 750, 751, 707/767; 705/319
See application file for complete search history.

(56) References Cited

U.S. PATENT DOCUMENTS

| | | | |
|---|---|---|---|
| 4,903,306 A * | 2/1990 | Nakamura | G10L 15/00 704/239 |
| 8,417,713 B1 | 4/2013 | Blair-Goldensohn et al. | |
| 8,484,205 B1 * | 7/2013 | Cohen | G06Q 30/02 707/637 |

(Continued)

FOREIGN PATENT DOCUMENTS

| | | |
|---|---|---|
| WO | 2013101809 A2 | 7/2013 |
| WO | 2013101812 A1 | 7/2013 |

OTHER PUBLICATIONS

Jie Bao et al., GeoRank: An Efficient Location-Aware News Feed Ranking System, SIGSPATIAL'13: Proceesings of the 21st ACM SIGSPATIAL International Conference on Advances in Geographic Information Systems, pp. 184-193, Nov. 2013 (Year: 2013).*

*Primary Examiner* — Greta L Robinson
(74) *Attorney, Agent, or Firm* — Browdy and Neimark, P.L.L.C.

(57) ABSTRACT

The present invention provides a method for ranking an incoming news feed comprising a header. The method comprising the steps of: receiving the incoming news feed with headers, extracting the incoming news feed's header, performing part-of-speech-tagging of the extracted header's words and associating to each of the header's words a code characterizing its grammatical function, generating the list of the incoming header's words codes, associating the generated list to the incoming news feed, as its pattern and computing a score for the incoming news feed according to predefined rules defining the score based on the its pattern.

20 Claims, 6 Drawing Sheets

(56) References Cited

U.S. PATENT DOCUMENTS

| | | | |
|---|---|---|---|
| 2008/0010337 A1* | 1/2008 | Hayes | G06Q 10/00 |
| | | | 709/202 |
| 2008/0126476 A1* | 5/2008 | Nicholas | G06Q 10/10 |
| | | | 709/203 |
| 2010/0179915 A1* | 7/2010 | Nastacio | G06Q 30/02 |
| | | | 705/319 |
| 2011/0225174 A1 | 9/2011 | Artzt et al. | |
| 2013/0103385 A1 | 4/2013 | Ghosh et al. | |
| 2013/0103386 A1 | 4/2013 | Zhang et al. | |
| 2013/0218885 A1* | 8/2013 | Satyanarayanan | G06Q 30/016 |
| | | | 707/728 |
| 2014/0207860 A1* | 7/2014 | Wang | H04L 65/403 |
| | | | 709/204 |

* cited by examiner

| | |
|---|---|
| agreed | 1 |
| agreement | 1 |
| agrees | 1 |
| alarm | -2 |
| Alarmed | -2 |
| alarmist | -2 |
| alarmists | -2 |
| Anticipation | 1 |
| Anticompetitive | -1 |
| Antitrust | -1 |
| Anxiety | -2 |
| Anxious | -2 |
| Apathetic | -3 |
| Apathy | -3 |
| Apeshit | -3 |
| Apocalyptic | -2 |
| Apologies | -1 |
| Breakthrough | 3 |
| Breakthroughs | 1 |
| Breathtaking | 5 |
| Bribe | -3 |

Fig. 5

SYSTEM AND METHOD FOR RANKING NEWS FEEDS

BACKGROUND

1. Technical Field

The invention relates to the field of content provision services, more particularly to content selection depending on their potential interest to the service users, and still more precisely to the ranking of news feeds by this interest.

For that purpose, the present invention relates to the field of filter ranking content items, and more particularly of selection/identification and filtering and scoring content items based on speech analysis system.

2. Related Art

Known, prior art techniques of content analyzing for rating are based on analyzing context or checking popularity and feedback of users.

International application NO. WO2010120679 titled "Emotivity and vocality measurement (Blatt Eli, Brookeside, Cates Thomas)", discloses analyzing free-form text comments provided by a user and estimate tone of the user's feedback. Such estimations may be reflected in a single numerical value which is used for determining the customer attitude toward the company.

There are patents or patent applications which disclose analyzing texts aspects such as emotivity or sentiment, in order to rank their object (service, reviewable object, company, etc.), rather than the text itself. Some of the patents or patent applications disclose the use of "part of speech tagging" of text inputs, but in order to identify these text inputs objects, rather than to compute a score for these text inputs.

There are known techniques for estimating user sentiment and emotional level.

Us patent application NO. US2013103386 titled, "Performing sentiment analysis" (Hewlett Packard) discloses method of performing sentiment analysis by identifying one or more sentences in a microblog, identifying one or more opinion words in the sentences based on an opinion lexicon.

US patent application No. US2013103385, titled "Performing sentiment analysis" (Hewlett Packard), discloses a method of performing sentiment analysis by performing a first sentiment analysis on microblogging data based on a method using an opinion lexicon. The method also includes training a classifier using training data from the first sentiment analysis.

U.S. Pat. No. 8,417,713, titled "Sentiment detection as a ranking signal for reviewable entities" (Google), discloses a method for ranking reviewable entities based on sentiment expressed about the entities. A plurality of sentiment scores associated with the plurality of review texts are generated, wherein each sentiment score for a review text indicates a sentiment directed to the entity referenced by the review text. A plurality of ranking scores for the plurality of entities are generated wherein each ranking score is based at least in part on one or more sentiment scores associated with one or more review texts referencing the entity.

International application No. WO201310112, titled "Methods and systems for generating corporate green score using social media sourced data and sentiment analysis" (Thomson Reuters), disclose a a News/Media Analytics System (NMAS) adapted to automatically process and "read" news stories and content from blogs, twitter, and other social media sources, represented by news/media corpus, in as close to real-time as possible. Quantitative analysis, techniques or mathematics, such as green scoring/ composite module and sentiment processing module are processed to arrive at green scores, green certification, and/or model the value of financial securities, including generating a green score, green compliance certification, and a composite environmental or green index.

International application No. WO2013101809, titled "Methods and systems for generating composite index using social media sourced data and sentiment analysis" (Thomson Reuters), disclose a News/Media Analytics System (NMAS) adapted to automatically process and "read" news stories and content from blogs, twitter, and other social media sources, represented by news/media corpus, in as close to real-time as possible. Quantitative analysis, techniques or mathematics, such as green scoring/composite module and sentiment processing module are processed to arrive at green scores, green certification, and/or model the value of financial securities, US application No. US2011225174, titled "Media value engine" (General Sentiment), disclose determining a media value associated mentions of an entity in one or more documents based on a sentiment attributed to the mentions of the entity and/or a frequency with which the entity is mentioned.

US application No. US2009216524, titled "Method and system for estimating a sentiment for an entity" (Siemens Enterprise Communications), disclose a method for estimating a sentiment conveyed by the content of information sources towards an entity. The sentiment is obtained with respect to a query context that may be specified, e. g. by specific terms or expressions, like a product or service name. A sentiment dictionary having a plurality of sentiment terms is provided, wherein each sentiment term has assigned a sentiment value, and at least one of said sentiment terms is associated to a group context. Text documents are screened for occurrences of sentiment terms that are associated to a group context corresponding to the query context. Calculating a sentiment score value is performed as a function of the occurrences of sentiment terms having a similar or same group context as the query context. The method may be carried out automatically without manual analysis of the actual semantic content of the text documents under consideration.

BRIEF SUMMARY

The present invention provides a method for ranking incoming news feed comprising a header. The method comprising the steps of: receiving the incoming news feed with headers, extracting the incoming news feed's header, performing part-of-speech-tagging of the extracted header's words and associating to each of the header's words a code characterizing its grammatical function, generating the list of the incoming header's words codes, associating the generated list to the incoming news feed, as its pattern and computing a score for the incoming news feed according to predefined rules defining the score based on the its pattern.

According to some embodiments of the present invention the predefined rules include checking pattern frequencies in pattern library including aggregation of header news patterns.

According to some embodiments of the present invention the predefined rules include checking pattern similarity in pattern library including aggregation of history header news patterns.

According to some embodiments of the present invention the method further comprising the steps of: performing sentiment analysis of the extracted header, thus computing a header's sentiment level, by using a predetermined sentiment lexicon comprising a list of associations between a sentiment level and a word, updating the incoming news feed's header score based on the sentiment analysis result, According to some embodiments of the present invention the sentiment analysis includes: summing the extracted header's words sentiment levels obtained based on the sentiment lexicon and assigning a first predetermined value to the sentiment level of the extracted header's words not appearing in the sentiment lexicon.

According to some embodiments of the present invention the method further comprising the steps of: receiving popularity figures of the incoming news feed based on aggregated information including at least one of: viewings number of the news feed, number of user feedbacks or interactions with the incoming news feed, normalizing popularity figures of each word of the extracted header and Updating the incoming news feed's score based on its popularity normalized figures.

According to some embodiments of the present invention the incoming news feed score computing step includes: assigning the incoming news feed score a value based on a pattern library comprising a list of associations of a score to a pattern and assigning the incoming news feed score a second predetermined value if the pattern doesn't appear in the pattern library.

According to some embodiments of the present invention the method further comprising a preliminary phase of constructing the pattern library comprising the steps of: receiving a number of news feeds headers, analyzing each of these headers, including: performing part-of-speech-tagging of each of the header's words, thus associating to each of the header's words a code characterizing its grammatical function, generating the list of the header's words codes, associating the generated list to the news feed header, as its pattern, associating, to each of the patterns, of its frequency defined as the number of news feeds headers to which it has been associated, sorting patterns by decreasing frequency and computing the drop and select and record the patterns with frequency greater than the drop as the pattern library.

According to some embodiments of the present invention the method of further comprising the steps of: raising by 1 the associated frequency of the incoming news feed pattern in the pattern library, if the incoming news feed pattern already appeared in the pattern library, Introducing, with associated frequency 1, the incoming news feed pattern in the pattern library, if it didn't already appear in the pattern library, sorting patterns by decreasing frequency and computing the drop, select and record the patterns with frequency greater than the drop as the pattern library.

The method of claim 7 the method further comprising the steps of: performing sentiment analysis of the news header by checking each word sentiment grade using predefined sentiment lexicon, analyzing popularity statistics of feed news based aggregated information of user feedback or interaction with feed news and Updating ranking of news feeds header based on sentiment analysis and popularity analysis.

The present invention provides a system for ranking an incoming news feed comprising a header, said system comprised of: a news feed acquisition module for performing the steps of: aggregating updated feed new headers from different sources, receiving at least one news feed, performing part-of-speech-tagging of the extracted header's words and associating to each of the header's words a code characterizing its grammatical function, generating the list of the incoming header's words codes and associating the generated list to the incoming news feed, as its pattern and news feed ranking module ranking new upcoming newsfeeds headers by applying the following step: computing a score for the incoming news feed according to predefined rules defining the score based on the its pattern.

According to some embodiments the present invention system further comprising a pattern library including aggregated code vectors of tagged feed news headers by grammatical function.

According to some embodiments the present invention the predefined rules include checking pattern frequencies in pattern library including aggregation of header news patterns.

According to some embodiments the present invention the predefined rules include checking pattern similarity in pattern library including aggregation of history header news patterns.

According to some embodiments the present invention the ranking module further apply the following steps: performing sentiment analysis of the extracted header, thus computing a header's sentiment level, by using a predetermined sentiment lexicon comprising a list of associations between a sentiment level to a word, and updating the incoming news feed's header score based on the sentiment analysis result.

According to some embodiments the present invention the sentiment analysis includes: summing the extracted header's words sentiment levels obtained based on the sentiment lexicon and assigning a first predetermined value to the sentiment level of the extracted header's words not appearing in the sentiment lexicon.

According to some embodiments the present invention the ranking module further comprising the steps of: receiving popularity figures of the incoming news feed based on aggregated information including at least one of: viewings number of the news feeds, number of user feedbacks or interactions with the incoming news feed, normalizing popularity figures of each word of the extracted header and Updating the incoming news feed's score based on its popularity normalized figures.

According to some embodiments the present invention the ranking module further includes: Assigning the incoming news feed score a second predetermined value if the pattern doesn't appear in the pattern library.

According to some embodiments the present invention the system further comprising the pattern library creation module applying the following steps: receiving a number of news feeds headers, analyzing each of these headers, including: performing part-of-speech-tagging of each of the header's words, thus associating to each of the header's words a code characterizing its grammatical function, generating the list of the header's words codes, associating the generated list to the news feed header, as its pattern, associating, to each of the patterns, of its frequency defined as the number of news feeds headers to which it has been associated, sorting patterns by decreasing frequency and computing the drop, select and record the patterns with frequency greater than the drop as the pattern library.

According to some embodiments the present invention pattern library creation module further applies the steps of: raising by 1 the associated frequency of the incoming news feed pattern in the pattern library, if the incoming news feed pattern already appeared in the pattern library, Introducing, with associated frequency 1, the incoming news feed pattern in the pattern library, if it didn't already appear in the pattern library, sorting patterns by decreasing frequency and computing the drop select and record the patterns with frequency greater than the drop as the pattern library.

According to some embodiments the present invention the ranking module further apply the steps of: performing sentiment analysis of the news header by checking each word sentiment grade using predefined sentiment lexicon, analyzing popularity statistics of feed news based aggregated information of user feedback or interaction with feed news and updating ranking of newsfeeds header based on sentiment analysis and popularity analysis.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings:

FIG. 5 is a table illustrating a part of sentiment lexicon, as used by some embodiments of the present invention.

Figure 1:
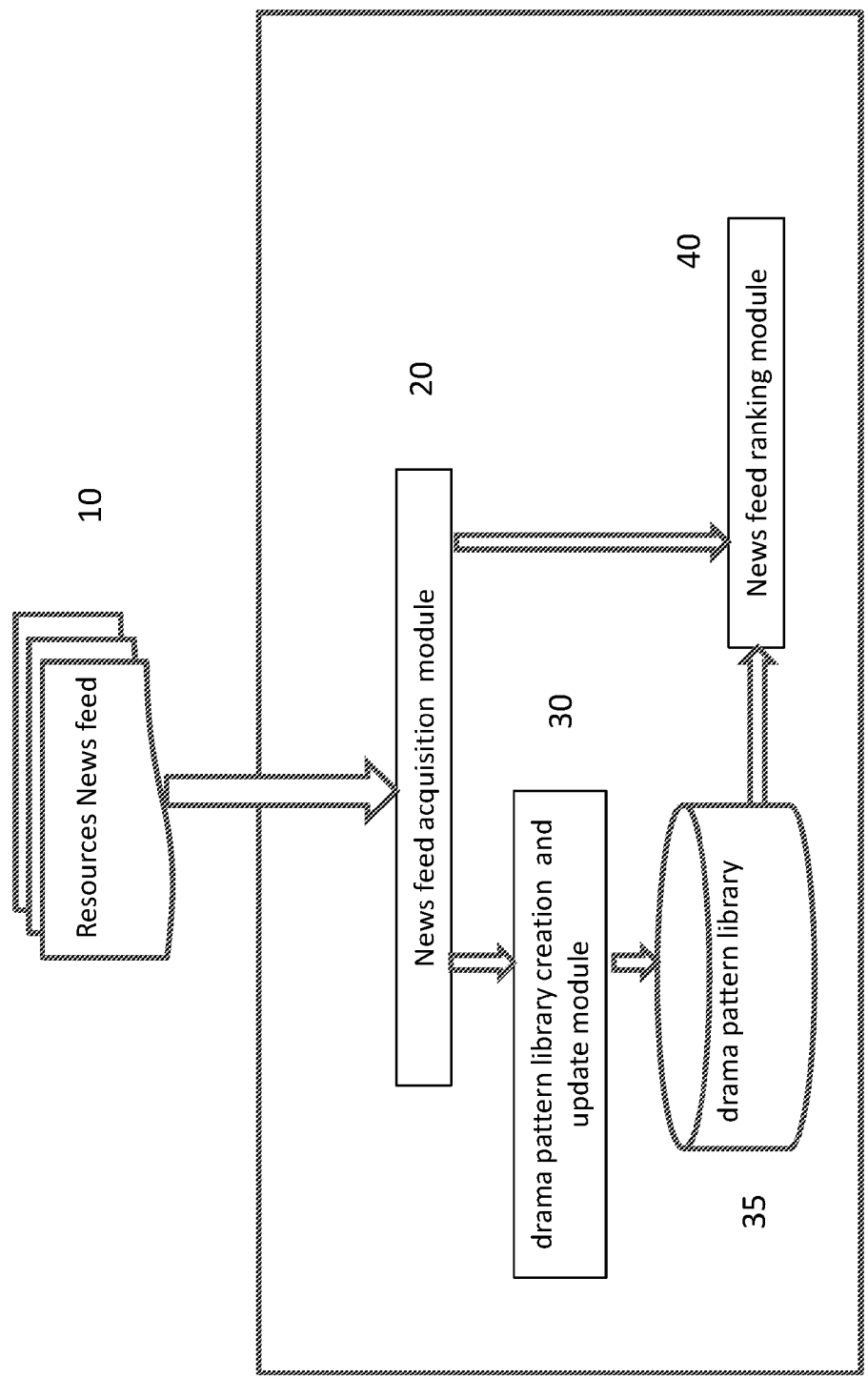
FIG. 1 is a high level schematic block diagram of a news feeds scoring system, according to the present invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments and liable to be practiced or carried out in various ways. Also, it is to be understood that the phraseology and terminology employed herein is for the purpose of description and should not be regarded as limiting.

Prior to setting forth the background of the related art, it may be helpful to set forth definitions of certain terms that will be used hereinafter.

The term "news feeds" as used herein in this application, is defined as any content having a text header which is updated frequently by a content sources, including news web sites, blogging websites, newsletters etc.

The invention disclose is a Natural Language Processing method for ranking news feeds based on a dedicated drama patterns library construction and combined exploitation with a previously available sentiment lexicon, and related popularity statistics.

It relies on the assumption that the more a content item drama score is high, the more it is going to interest a large number of people.

FIG. 1 is a high level schematic block diagram of a news feeds scoring system, according to the present invention. The scoring system includes News feed acquisition module (20) for retrieving and aggregating news feeds from different news resources (10), drama pattern library creation and update module (30) for generating and updating reference database (35) of headers patterns and News feed ranking module 40 for calculating score of news feeds.

Figure 2:
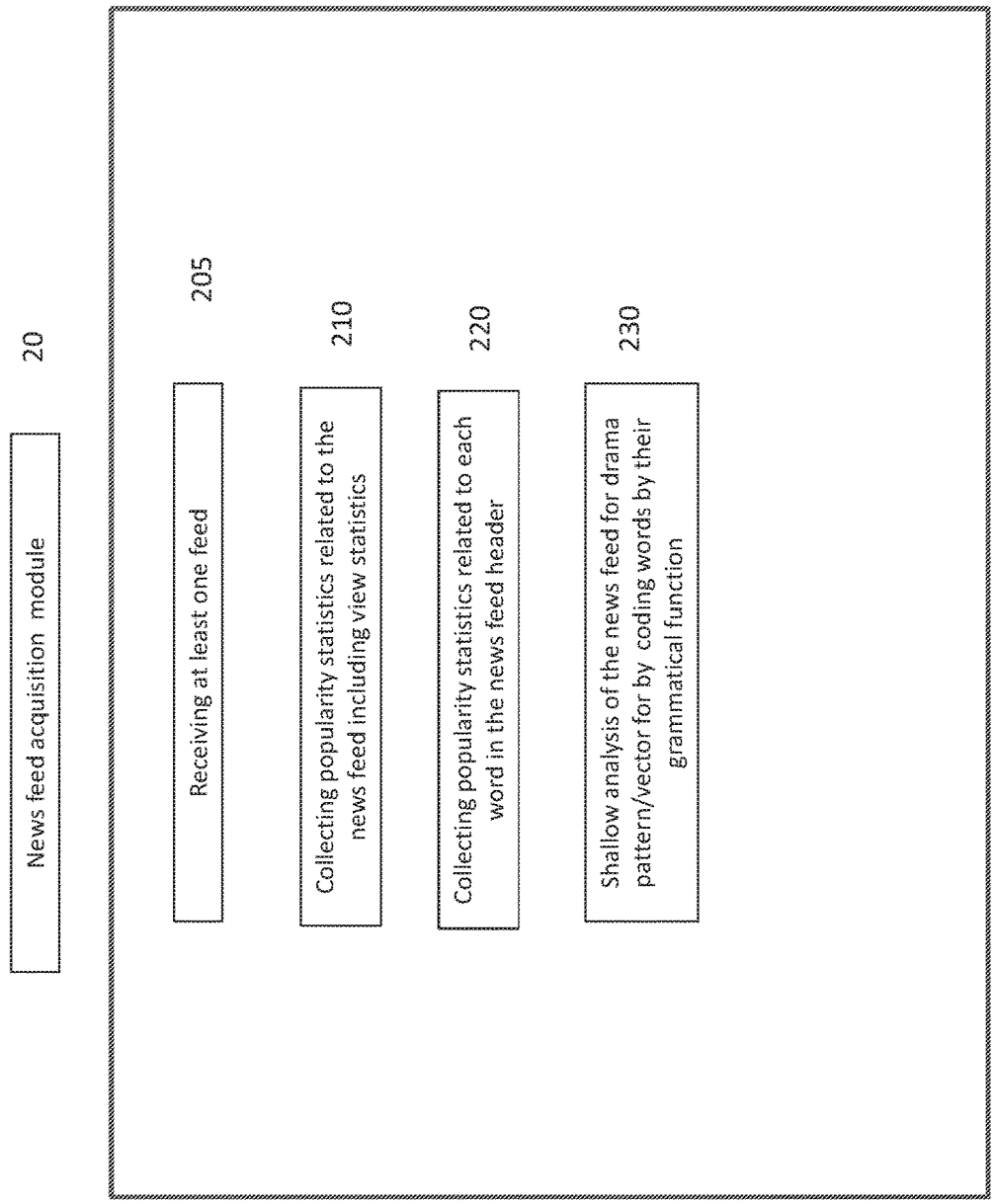
FIG. 2 is a high level flowchart illustrating News feeds acquisition method, according to some embodiments of the present invention.

FIG. 2 is a high level flowchart illustrating News feeds acquisition method, according to some embodiments of the present invention. The acquisition method includes the initial step of receiving a new news feed (205). It also may include one of the following steps: collecting popularity statistics related to the news feed including viewing statistics 210 (such as number of views for each news feed or number of responses), collecting popularity statistics related to each word in the news feed header 220 (such as number of searches for the considered word performed in different Search engines).

At the next step shallow analysis is applied to the news feeds headers is by preforming context based part-of-speech tagging and associating to each word in a sentence, a code characterizing its grammatical function (230). Shallow analysis technique is known in the art (see Wikipedia on "part of speech tagging" http://en.wikipedia.org/wiki/Part_of_speech_tagging).

The coding may use for example known conventions, such as the world accepted notation, (http://en.wikipedia.org/wiki/Brown_Corpus#Part-of-speech_tags_used). A number of well-known commercial or open source tools allow conducting the shallow analysis.

Figure 3:
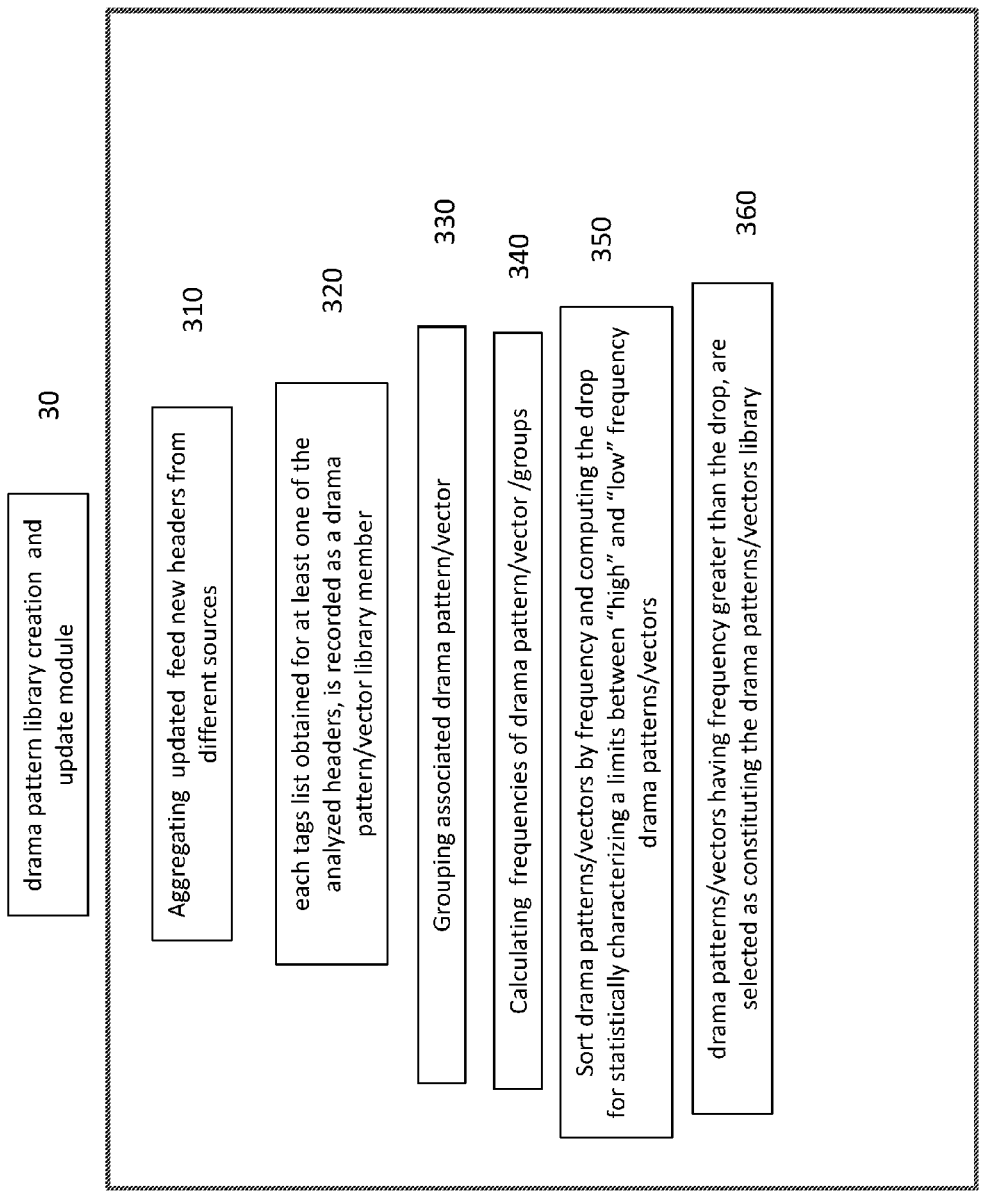
FIG. 3 is a high level flowchart illustrating drama pattern library creation and update method, according to some embodiments of the present invention.

FIG. 3 is a high level flowchart illustrating drama pattern library creation and update method, according to some embodiments of the present invention. The method is based on acquiring news feeds headers 310 from different news sources, such news websites, blogs newsletter etc. Gathering large number of headers provides better, data representation of the constructed drama patterns/vectors library, accordingly the scoring process is more accurate. Thus it's preferable to collect as much headers as possible.

In the same objective, it is important to avoid introducing biases in the collected headers associated drama patterns/vectors, by filtering them by characteristics such as author, category, subject, etc, which may lead to selecting headers having specific structures and drama patterns/vectors. Optionally the headers collection may use single news websites or a number of news sites. In the same objective, all of the headers of this or these news sites should preferably be collected.

Each tags list obtained for at least one of the analyzed headers, is recorded as a drama pattern/vector library member (320). Optionally the drama pattern/vector are grouped by association (330). At the next steps are calculated frequencies of drama pattern/vector or groups of drama pattern/vector (340), the drama patterns/vectors are sorted by frequency and a drop is computed for statistically characterizing the limits between "high" and "low" frequency drama patterns/vectors (350), the drama patterns/vectors having frequency greater than the drop, are selected as constituting the drama patterns/vectors library (360).

Figure 4:
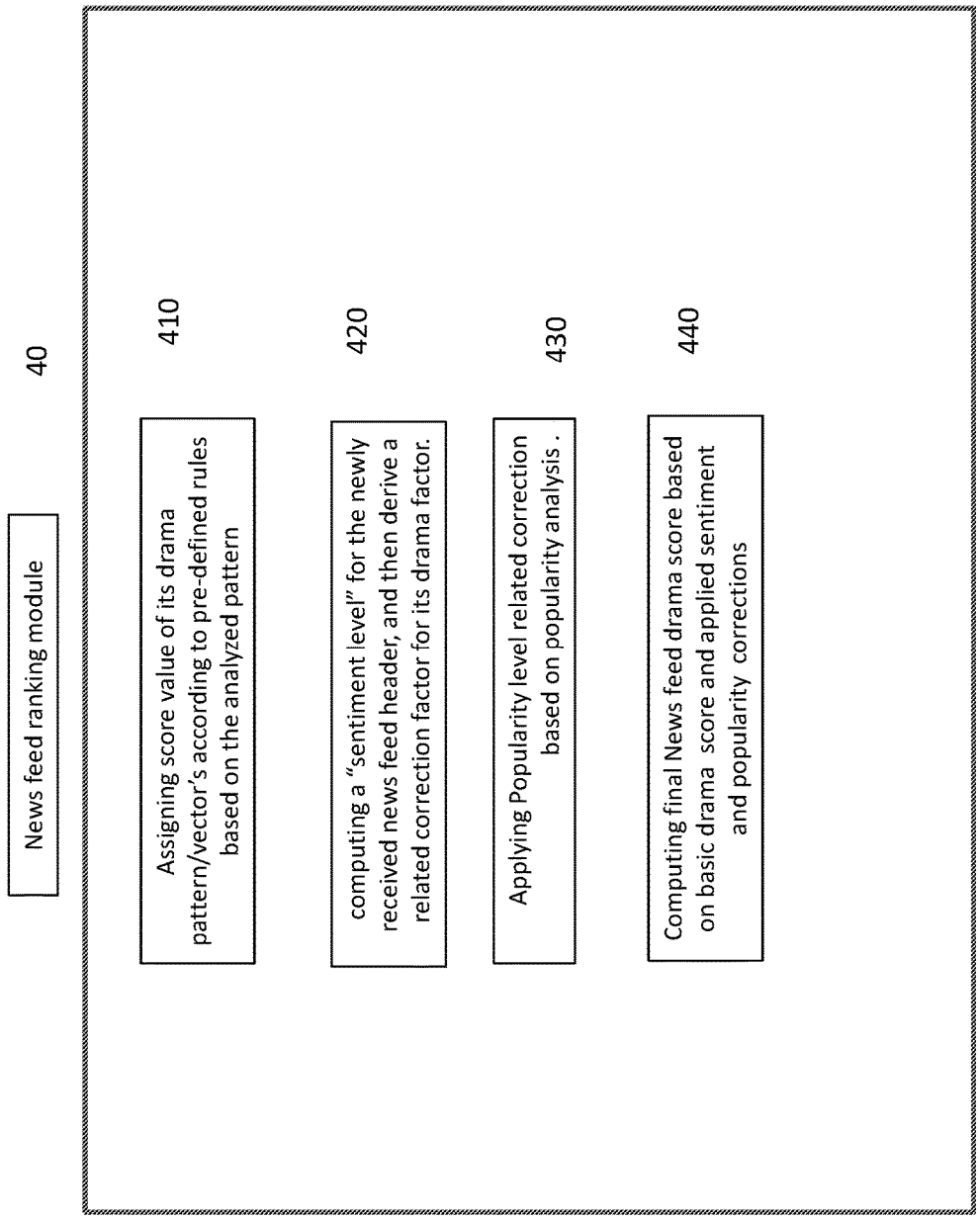
FIG. 4 is a high level flowchart illustrating News feed ranking method, according to some embodiments of the present invention.

FIG. 4 is a high level flowchart illustrating News feed ranking method, according to some embodiments of the present invention. The ranking method according to some embodiments includes at least one of the following steps: assigning score value of its drama pattern/vector's according to pre-defined rules based on the analyzed pattern (410). The predefined rules may include comparison to known patterns of news headers, checking frequency of history patterns appearance or checking similarity to known patterns, where the value can be determined according to frequency value or degree of similarity. According to other embodiments of the present invention the ranking method includes: computing a "sentiment level" for the newly received news feed header, and then derive a related correction factor for its drama factor (420) and/or applying popularity level related correction based on popularity analysis (430). Finally are computed final News feed drama score based on basic drama score and applied sentiment and popularity corrections (440).

A word's sentiment level can be defined by a sign of an integer between two thresholds (e.g. −5 and 5), which represents an emotion, feeling or attitude in relation to the word, the scale may refer word's having negative or positive meaning. FIG. 5 is an example of sentiment lexicon sample, wherein the word "breathtaking" is assigned a positive very high emotional charge through a sentiment level of +5, and the word "alarm" a negative low one through a sentiment level of −2.

Figure 4A:
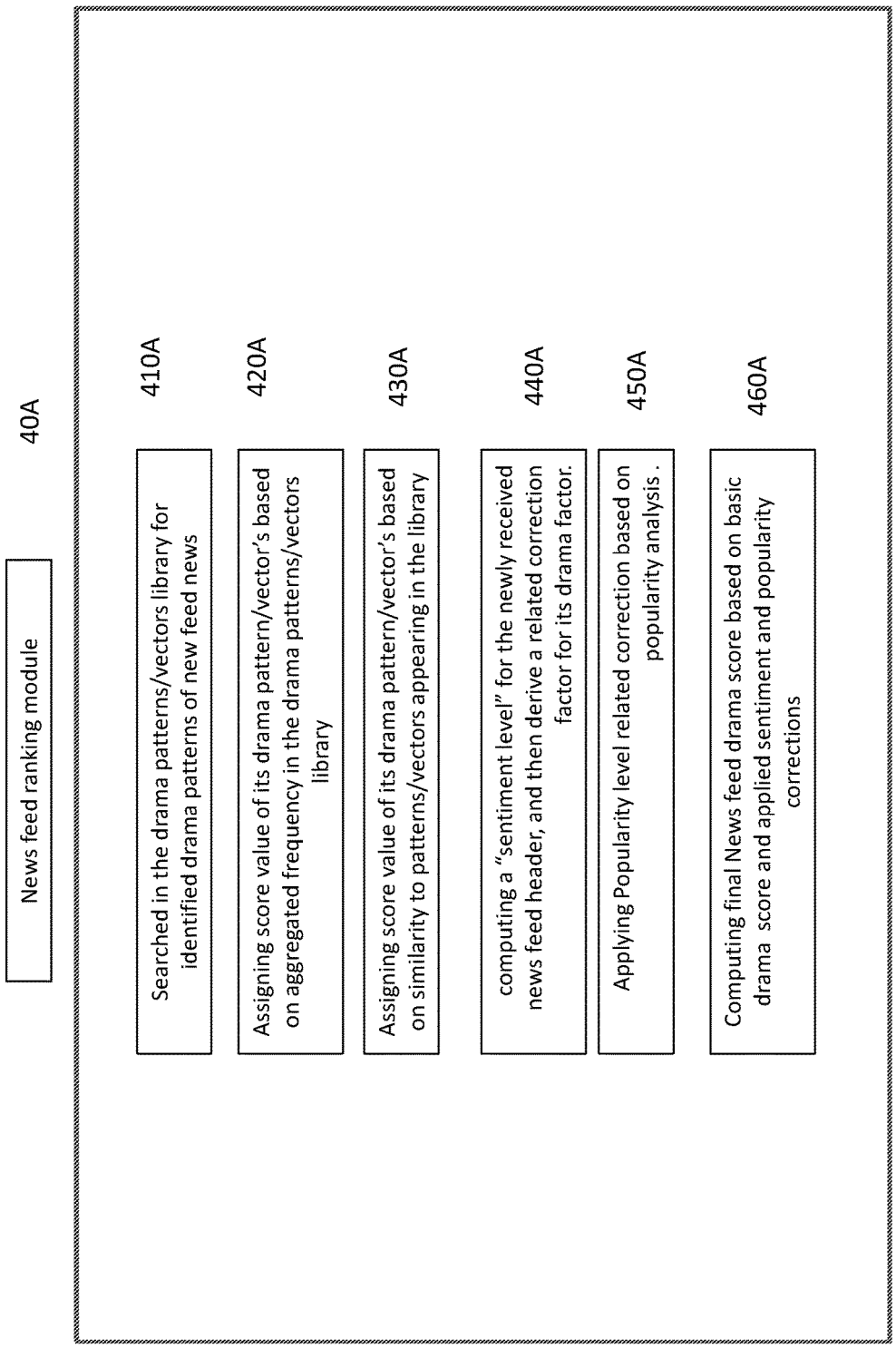
FIG. 4A is a high level flowchart illustrating News feed ranking method using pattern library, according to some embodiments of the present invention.

FIG. 4A is a high level flowchart illustrating News feed ranking method using pattern library, according to some embodiments of the present invention. The rankling method according to some embodiments include the following steps: searching in the drama patterns/vectors library for identified drama patterns of new news feed (410A) and accordingly calculating and assigning score value of its drama pattern/vector's based on aggregated frequency in the drama patterns/vectors library (420A). If the identified drama patterns is not found in the library, the drama patterns/vectors is assigned with low value beneath predefined threshold. The threshold can be define as less than or equal to the first decile, centile, or permille of the frequency series of the drama patterns/vectors in the library.

Optionally the score value is calculated and assigned to its drama pattern/vector's based on similarity to patterns/vectors appearing in the library (430A).

According to some embodiments the ranking method includes computing a "sentiment level" for the newly received news feed header (440A), and then derive a related correction factor for its drama factor and or applying Popularity level related correction based on popularity analysis (450A). Finally computing final News feed drama score based on basic drama score and applied sentiment and popularity corrections (460A).

The computation of "sentiment level", is calculated as the sum of its words sentiment levels in the sentiment lexicon. In case the word doesn't appear in the sentiment lexicon, it is assumed to be assigned a "neutral" sentiment level with value zero. The sentiment level may be calculated using alternative methods. The sentiment level related correction factor may be computed, for example as being equal to 1+sentiment Level/100. For example, the sentiment level related correction factor may be computed as shown below for the popularity level related correction factor.

The method of applying Popularity level related correction may include checking news feed's popularity statistic, normalizing of the news feed's popularity figures and accordingly deciding whether or not to apply a predetermined fixed penalty to the header's drama score depending on the normalized popularity figures. The normalization may be performed by dividing it by the maximum value of the same figures for all of the already processed news feeds, which can be represented by the formula: normalizedPopularity:=Popularity/maxPopularity. Alternately this normalization operation may be realized by dividing the considered news feed popularity figure by the sum of all of the already processed news feeds popularity figures. Any other normalization computation may be used for this purpose. Optionally the news feed popularity figure is derived from its header's words popularity figures. Then, the resulting news feed popularity figure is normalized as above described above.

The popularity figure may be directly collected for the news feed header, or derived from its words, the above normalization operation can be carried out for each of them, and accordingly a unique normalized news feed figure (here denoted normalizedPopularityFigure) may be computed, for example as a mean value of the resulting normalized figures.

Finally, the computed news feed header's normalized popularity figure is compared to a predetermined threshold, and the decision of applying or not the predetermined fixed penalty to the header's drama score is taken depending on the result of the comparison. For example the penalty is applied if the news feed header's normalized popularity figure is less than the predetermined threshold. Accordingly the popularity level related correction factor is computed as being equal to $1-(1_{(normalizedPopularity<popularityThreshold)} \times fixedPenalty)$ where $1_x$ is the function whose value is 1 if X is true, and 0 if X is false.

For example the predetermined popularity threshold has value 0.5, and the predetermined penalty is applied if the news feed header's normalized popularity figure is less than 0.5. The predetermined penalty may have a predetermined fixed value, or vary depending on the distance of the header's normalized popularity from the popularity threshold, for example proportionally or exponentially to the header's normalized popularity and popularity threshold ratio or difference.

According to another example, the predetermined threshold has value inferior to 0.5, inferior to 0.3, 0.25, or 0.1.

Any other ways of computing this popularity level related correction factor may be used. For example, the popularity level related correction factor may be computed as shown above for the sentiment level related correction factor.

The news feed drama score computation may be computed as the product of the above described raw drama score, sentiment level related correction factor, and popularity level related correction factor, of the considered news feed. This may be represented by formula $dramaScore:=rawDramaScore \times (1+sentimentLevel/100) \times (1-(1_{(normalizedPopularity<popularityThreshold)} \times fixedPenalty))$ Any other ways of combining raw drama score, sentiment level related correction factor, and popularity level related correction factor in order to derive the news feed's drama score may be used.

According to some embodiments of the invention is provided an updating process of the drama patterns/vectors library according to the results of the processing of a newly received news feed. The updating process may include the steps of creation drama library as described above to be applied on the new version of the drama pattern/vector library, resulting of the integration of the tags list resulting of the considered newly received news feed header shallow analysis The updating process may include increasing by 1 the associated frequency of this drama pattern/vector if it already was a library member, or else adding it into the library with associated frequency.

The invention claimed is:

1. A method for ranking an incoming news feed comprising a header, said method comprising the steps of:
   receiving the incoming news feed with headers;
   extracting the incoming news feed's header;
   performing speech analysis tagging of the extracted header's words and associating to each of the header's words a code characterizing its grammatical function;
   generating the list of the incoming header's words codes;
   associating the generated list to the incoming news feed, as its pattern;
   computing a score for the incoming news feed according to predefined rules defining the score based on the its pattern;
   wherein the predefined rules include checking pattern frequencies in pattern library including aggregation of header news patterns;
   performing sentiment analysis of the extracted header, thus computing a header's sentiment level, by using a predetermined sentiment lexicon comprising a list of associations between a sentiment level and a word; and
   updating the incoming news feed's header score based on the sentiment analysis result.

2. The method of claim 1 wherein the sentiment analysis includes:
   summing the extracted header's words sentiment levels obtained based on the sentiment lexicon;
   assigning a first predetermined value to the sentiment level of the extracted header's words not appearing in the sentiment lexicon.

3. The method of claim 1 wherein the incoming news feed score computing step includes:
   assigning the incoming news feed score a value based on a pattern library comprising a list of associations of a score to a pattern;
   assigning the incoming news feed score a second predetermined value if the pattern doesn't appear in the pattern library.

4. The method of claim 3 further comprising a preliminary phase of constructing the pattern library comprising the steps of:
   receiving a number of news feeds headers;
   analyzing each of these headers, including:
      performing speech analysis tagging of each of the header's words, thus associating to each of the header's words a code characterizing its grammatical function;
      generating the list of the header's words codes;
      associating the generated list to the news feed header, as its pattern;
   associating, to each of the patterns, of its frequency defined as the number of news feeds headers to which it has been associated;
   sorting patterns by decreasing frequency and computing the drop;
   select and record the patterns with frequency greater than the drop as the pattern library.

5. The method of claim 4 further comprising the steps of:
   raising by 1 the associated frequency of the incoming news feed pattern in the pattern library, if the incoming news feed pattern already appeared in the pattern library;
   introducing, with associated frequency 1, the incoming news feed pattern in the pattern library, if it didn't already appear in the pattern library;
   sorting patterns by decreasing frequency and computing the drop;
   select and record the patterns with frequency greater than the drop as the pattern library.

6. The method of claim 1 further comprising the steps of:
   performing sentiment analysis of the news header by checking each word sentiment grade using predefined sentiment lexicon;
   analyzing popularity statistics of feed news based aggregated information of user feedback or interaction with feed news;
   updating ranking of news feeds header based on sentiment analysis and popularity analysis.

7. A system for ranking an incoming news feed comprising a header, said system comprised of:
   news feed acquisition module for performing the steps of:
      aggregating updated feed new headers from different sources;
      receiving at least one news feed;
      performing speech analysis tagging of the extracted header's words and associating to each of the header's words a code characterizing its grammatical function;
      generating the list of the incoming header's words codes; and
      associating the generated list to the incoming news feed, as its pattern;
   news feed ranking module ranking new upcoming newsfeeds headers by applying the following step: computing a score for the incoming news feed according to predefined rules defining the score based on the its pattern;
   a pattern library including aggregated code vectors of tagged feed news headers by grammatical function.

8. The system of claim 7 wherein the predefined rules include checking pattern similarity in pattern library including aggregation of history header news patterns.

9. The system of claim 7 wherein the ranking module further apply the following steps:
   performing sentiment analysis of the extracted header, thus computing a header's sentiment level, by using a predetermined sentiment lexicon comprising a list of associations between a sentiment level to a word;
   updating the incoming news feed's header score based on the sentiment analysis result.

10. The system of claim 9 wherein the sentiment analysis includes:
    summing the extracted header's words sentiment levels obtained based on the sentiment lexicon;
    assigning a first predetermined value to the sentiment level of the extracted header's words not appearing in the sentiment lexicon.

11. The system of claim 7 wherein the ranking module further includes: Assigning the incoming news feed score a second predetermined value if the pattern doesn't appear in the pattern library.

12. The system of claim 7 further comprising the pattern library creation module applying the following steps:
    receiving a number of news feeds headers;

analyzing each of these headers, including:
  performing speech analysis tagging of each of the header's words, thus associating to each of the header's words a code characterizing its grammatical function;
  generating the list of the header's words codes;
  associating the generated list to the news feed header, as its pattern;
associating, to each of the patterns, of its frequency defined as the number of news feeds headers to which it has been associated;
sorting patterns by decreasing frequency and computing the drop;
select and record the patterns with frequency greater than the drop as the pattern library.

13. The system of claim 12 wherein pattern library creation module further applies the steps of:
  raising by 1 the associated frequency of the incoming news feed pattern in the pattern library, if the incoming news feed pattern already appeared in the pattern library;
  introducing, with associated frequency 1, the incoming news feed pattern in the pattern library, if it didn't already appear in the pattern library;
  sorting patterns by decreasing frequency and computing the drop;
  select and record the patterns with frequency greater than the drop as the pattern library.

14. The system of claim 7 wherein the ranking module further apply the steps of:
  performing sentiment analysis of the news header by checking each word sentiment grade using predefined sentiment lexicon;
  analyzing popularity statistics of feed news based aggregated information of user feedback or interaction with feed news;
  updating ranking of newsfeeds header based on sentiment analysis and popularity analysis.

15. A method for ranking an incoming news feed comprising a header, said method comprising the steps of:
  receiving the incoming news feed with headers;
  extracting the incoming news feed's header;
  performing speech analysis tagging of the extracted header's words and associating to each of the header's words a code characterizing its grammatical function;
  generating the list of the incoming header's words codes;
  associating the generated list to the incoming news feed, as its pattern;
  computing a score for the incoming news feed according to predefined rules defining the score based on the its pattern;
  wherein the predefined rules include checking pattern similarity in pattern library including aggregation of history header news patterns;
  performing sentiment analysis of the extracted header, thus computing a header's sentiment level, by using a predetermined sentiment lexicon comprising a list of associations between a sentiment level and a word; and
  updating the incoming news feed's header score based on the sentiment analysis result.

16. A method for ranking an incoming news feed comprising a header, said method comprising the steps of:
  receiving the incoming news feed with headers;
  extracting the incoming news feed's header;
  performing speech analysis tagging of the extracted header's words and associating to each of the header's words a code characterizing its grammatical function;
  generating the list of the incoming header's words codes;
  associating the generated list to the incoming news feed, as its pattern; and
  computing a score for the incoming news feed according to predefined rules defining the score based on the its pattern;
  receiving popularity figures of the incoming news feed based on aggregated information including at least one of: viewings number of the news feed, number of user feedbacks or interactions with the incoming news feed;
  normalizing popularity figures of each word of the extracted header; and
  updating the incoming news feed's score based on its popularity normalized figures.

17. A method for ranking an incoming news feed comprising a header, said method comprising the steps of:
  receiving the incoming news feed with headers;
  extracting the incoming news feed's header;
  performing speech analysis tagging of the extracted header's words and associating to each of the header's words a code characterizing its grammatical function;
  generating the list of the incoming header's words codes;
  associating the generated list to the incoming news feed, as its pattern; and
  computing a score for the incoming news feed according to predefined rules defining the score based on the its pattern;
  performing sentiment analysis of the extracted header, thus computing a header's sentiment level, by using a predetermined sentiment lexicon comprising a list of associations between a sentiment level and a word;
  updating the incoming news feed's header score based on the sentiment analysis result.

18. A method for ranking an incoming news feed comprising a header, said method comprising the steps of:
  receiving the incoming news feed with headers;
  extracting the incoming news feed's header;
  performing speech analysis tagging of the extracted header's words and associating to each of the header's words a code characterizing its grammatical function;
  generating the list of the incoming header's words codes;
  associating the generated list to the incoming news feed, as its pattern; and
  computing a score for the incoming news feed according to predefined rules defining the score based on the its pattern;
  wherein the incoming news feed score computing step includes:
    assigning the incoming news feed score a value based on a pattern library comprising a list of associations of a score to a pattern;
    assigning the incoming news feed score a second predetermined value if the pattern doesn't appear in the pattern library.

19. A system for ranking an incoming news feed comprising a header, said system comprised of:
  news feed acquisition module for performing the steps of:
    aggregating updated feed new headers from different sources;
    receiving at least one news feed;
    performing speech analysis tagging of the extracted header's words and associating to each of the header's words a code characterizing its grammatical function;

generating the list of the incoming header's words codes; and associating the generated list to the incoming news feed, as its pattern; and news feed ranking module ranking new upcoming newsfeeds headers by applying the following step: computing a score for the incoming news feed according to predefined rules defining the score based on the its pattern;

wherein the predefined rules include checking pattern frequencies in pattern library including aggregation of header news patterns;

wherein the ranking module further applies the steps of:

performing sentiment analysis of the extracted header, thus computing a header's sentiment level, by using a predetermined sentiment lexicon comprising a list of associations between a sentiment level and a word; and updating the incoming news feed's header score based on the sentiment analysis result.

20. A system for ranking an incoming news feed comprising a header, said system comprised of:

news feed acquisition module for performing the steps of:

aggregating updated feed new headers from different sources;

receiving at least one news feed;

performing speech analysis tagging of the extracted header's words and associating to each of the header's words a code characterizing its grammatical function;

generating the list of the incoming header's words codes; and associating the generated list to the incoming news feed, as its pattern;

news feed ranking module ranking new upcoming newsfeeds headers by applying the following step: computing a score for the incoming news feed according to predefined rules defining the score based on the its pattern; and wherein the ranking module further comprising the steps of:

receiving popularity figures of the incoming news feed based on aggregated information including at least one of: viewings number of the news feeds, number of user feedbacks or interactions with the incoming news feed;

normalizing popularity figures of each word of the extracted header;

updating the incoming news feed's score based on its popularity normalized figures.

* * * * *